United States Patent
Hartwig et al.

(10) Patent No.: US 11,603,148 B2
(45) Date of Patent: Mar. 14, 2023

(54) DIVE-RESISTANT SUSPENSION FOR A SNOW MACHINE

(71) Applicant: C3 Powersports 2014 Ltd., Canoe (CA)

(72) Inventors: Tyler G. Hartwig, Canoe (CA); Kevin H. Forsyth, Salmon Arm (CA)

(73) Assignee: C3 PowerSports 2014 Ltd, Canoe (CA)

( * ) Notice: Subject to any disclaimer, the term of this patent is extended or adjusted under 35 U.S.C. 154(b) by 298 days.

(21) Appl. No.: 16/907,090

(22) Filed: Jun. 19, 2020

(65) Prior Publication Data
US 2020/0398913 A1    Dec. 24, 2020

(30) Foreign Application Priority Data

Jun. 21, 2019   (CA) .................................. CA 3047775

(51) Int. Cl.
*B62D 55/112*    (2006.01)
*B62D 55/116*    (2006.01)
(Continued)

(52) U.S. Cl.
CPC .......... *B62D 55/1125* (2013.01); *B60G 7/001* (2013.01); *B62D 55/116* (2013.01);
(Continued)

(58) Field of Classification Search
CPC .. B62D 55/1125; B62D 55/116; B60G 7/001; B60G 2300/322; B60G 2300/12;
(Continued)

(56) References Cited

U.S. PATENT DOCUMENTS

| | | | |
|---|---|---|---|
| 5,299,820 A | | 4/1994 | Lawwill |
| 5,727,643 A | * | 3/1998 | Kawano ............... B62D 55/108 |
| | | | 180/9.54 |

(Continued)

FOREIGN PATENT DOCUMENTS

| | | |
|---|---|---|
| CA | 2 246 683 A1 | 3/2000 |
| EP | 2 792 587 B1 | 12/2017 |
| WO | 2016/207570 A2 | 12/2016 |

OTHER PUBLICATIONS

"CMXBK 2017 Spring Order Program," © 2018 Snowbike World® Magazine, <https://www.snowbikeworld.com/2016/03/cmxbk-2017-snow-bike-spring-order-program> [retrieved Jul. 17, 2018], 8 pages.

(Continued)

*Primary Examiner* — Darlene P Condra
(74) *Attorney, Agent, or Firm* — Christensen O'Connor Johnson Kindness PLLC (57) ABSTRACT

A dive-resistant suspension for a snow machine having a ski assembly and a body has a swing arm and a resilient member that biases the swing arm downward relative to the body. The swing arm has a first rigid linkage and a second rigid linkage. The first rigid linkage has a first pivot point connected to the body of the snow machine and a second pivot point connected to the ski column. The second rigid linkage has a first pivot point connected to the body of the snow machine and a second pivot point connected to the ski column. The swing arm defines a travel path of the ski assembly as the swing arm moves between an operative position and a retracted position. In a first portion of the travel path, the ski assembly moves from the operative position forward and up relative to the body of the snow machine.

18 Claims, 11 Drawing Sheets

(51) Int. Cl.
*B60G 7/00* (2006.01)
*B62M 27/02* (2006.01)

(52) U.S. Cl.
CPC ....... *B62M 27/02* (2013.01); *B60G 2300/322* (2013.01); *B62M 2027/026* (2013.01)

(58) Field of Classification Search
CPC ... B60G 3/20; B62M 27/02; B62M 2027/026; B62K 25/24
See application file for complete search history.

(56) References Cited

U.S. PATENT DOCUMENTS

| | | | | |
|---|---|---|---|---|
| 5,904,216 | A * | 5/1999 | Furusawa | B62M 27/02 180/9.54 |
| 6,431,301 | B1 * | 8/2002 | Forbes | B62M 27/02 180/185 |
| 6,631,778 | B2 * | 10/2003 | Mallette | B62M 27/02 180/186 |
| 6,708,791 | B2 * | 3/2004 | Alexander | B62M 27/02 180/184 |
| 6,896,276 | B1 | 5/2005 | Sparrow | |
| 7,070,012 | B2 * | 7/2006 | Fecteau | B62M 27/02 305/128 |
| 7,210,695 | B2 | 5/2007 | Griffiths | |
| 7,854,285 | B1 * | 12/2010 | Giese | B62M 27/02 180/193 |
| 7,896,379 | B2 | 3/2011 | Nagao et al. | |
| 9,469,327 | B2 | 10/2016 | Anderson et al. | |
| 9,988,067 | B1 | 6/2018 | Mangum et al. | |
| 2008/0017431 | A1 * | 1/2008 | Sadakuni | B62D 55/10 180/193 |
| 2012/0205173 | A1 * | 8/2012 | Mallette | B62M 27/02 180/193 |
| 2014/0090915 | A1 * | 4/2014 | Fecteau | B62M 27/02 180/193 |
| 2018/0273136 | A1 * | 9/2018 | Voss | B62K 25/30 |

OTHER PUBLICATIONS off.road.cc., "First Ride: Motion's E18 anti-dive linkage fork," ©2008 Farrelly Atkinson (F-At) Limited, <https://off.road.cc/content/news/first-ride-motions-e18-anti-dive-linkage-fork-2654> [retrieved Jan. 30, 2019], 19 pages.

* cited by examiner

PRIOR ART

DIVE-RESISTANT SUSPENSION FOR A SNOW MACHINE

TECHNICAL FIELD

This relates to a suspension for a snow machine that resists compression due to friction experienced by the ski.

BACKGROUND

When operating a snow machine with suspension similar to a motorcycle, sometimes referred to as a snowbike, friction from the ground surface on the ski of the bike can cause the suspension of the snowbike to compress and the snowbike to dive forward. Diving can cause the operator to have less control and potentially cause accidents.

SUMMARY

According to an aspect, there is provided a dive-resistant suspension for a snow machine having a ski assembly and a body, the dive-resistant suspension comprising a swing arm connected between the ski assembly and the body, the swing arm comprising a first rigid linkage having a first pivot point connected to the body of the snow machine and a second pivot point connected to the ski column and a second rigid linkage having a first pivot point connected to the body of the snow machine at a point spaced from the first pivot point of the first rigid linkage and a second pivot point connected to the ski column at a point spaced from the second pivot point of the first rigid linkage and a resilient member that biases the swing arm downward relative to the body, wherein the swing arm defines a travel path of the ski assembly as the swing arm moves between an operative position and a retracted position, wherein the travel path lying within a plane that is perpendicular to a ground surface, and parallel to a forward direction of travel of the body, the travel path having a first portion that starts at the operative position, the first portion excluding movement of the ski assembly toward a rear end of the body as the swing arm moves toward the retracted position.

According to other aspects, the dive-resistant suspension may comprise one or more of the following features, alone or in combination: the body of the snow machine may comprise a steering column and the first pivot point of the first and second rigid linkages are connected to the steering column; the operative position may comprise a neutral weight applied to the snow machine; a second portion of the travel path may follow the first portion, wherein, in the second portion of the travel path, the ski assembly moves up and back relative to the body of the snow machine; the resilient member may comprise a spring or a pneumatic cylinder; the resilient member may be connected between any two elements of a group consisting of the body, the ski assembly, the first rigid linkage, and the second rigid linkage; an upward force applied to the ski assembly relative to the body may urge the snow ski toward the retracted position; a trail of the ski assembly may increase as the ski assembly moves toward the operative position in the first portion of the travel path; a second portion of the travel path may follow the first portion as the ski assembly moves from the operative position toward the retracted position, wherein a trail of the ski assembly decreases as the ski moves along the second portion of the travel path toward the retracted position; and a biasing force of the resilient member may increase as the ski assembly moves toward the retracted position.

According to an aspect, there is provided a dive-resistant suspension for a snow machine that resists compression due to friction while the snow machine is being operated, the snow machine having a body and a ski assembly, the dive-resistant suspension comprising a swing arm pivotally connected between the body and the ski assembly, the swing arm being biased downward relative to the body, the pivotal movement of the swing arm defining a travel path of the ski assembly between an operative position and a retracted position, wherein the travel path comprises a first portion that starts at the operative position and lies within a plane that is perpendicular to a ground surface and parallel to a forward direction of travel of the body, the first portion excluding movement of the ski assembly toward a rear end of the body as the snow machine moves toward the retracted position.

According to other aspects, the dive-resistant suspension may comprise one or more of the following features, alone or in combination: an upward force applied to the ski assembly relative to the body may urge the ski assembly toward the retracted position of the travel path; the operative position may comprise a neutral weight applied to the snow machine; a horizontal force applied to the ski assembly toward the body may urge the ski assembly toward the operative position of the travel path when the ski assembly is in the first portion of the travel path; the horizontal force may comprise friction from the ground surface; a trail of the ski assembly may increase when the ski assembly moves along the first portion of the travel path toward the operative position; a trail of the ski assembly may decrease when the ski assembly moves along a second portion of the travel path that follows the first portion as the ski assembly moves from the operative position toward the retracted position; and the swing arm may be biased by a spring or pneumatic cylinder.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

A suspension, generally identified by reference numeral 10, will now be described with reference to FIG. 1 through 12. In the depicted example, suspension 10 is used as part of a snow machine 100 to provide cushioning between a body 102 and a ski assembly 104 of snow machine 100. As used herein, "body" generally refers to the frame of snow machine 100 and the component to which suspension 10 is connected, typically steering column 106. The preferred embodiment will be described in terms of attaching suspension 10 along steering column 106, and in particular, by replacing a regular suspension with dive-resistant suspension 10. However, suspension 10 may also be attached directly to the frame of snow machine 100 by making suitable adjustments that will be understood by those skilled in the art. Generally speaking, suspension 10 will compress and extend along a path that lies in a plane perpendicular to the direction of travel as with the such that the pivot points in suspension 10 described below will be parallel to the ground surface and perpendicular to the direction of travel. This may be contrasted to a traditional snowmobile As depicted, suspension 10 is used to provide cushioning for a snow ski located at a front portion 106 of snow machine 100, however it will be understood that suspension 10 may be used in any configuration where resistance to compression due to friction is needed. Snow machine may have a plurality of ski assemblies 104 and a plurality of suspensions 10. As shown, body 102 of snow machine 100 may have a steering column 106 to which suspension 10 is connected. Suspension 10 that is connected to steering column 106 may turn with steering column 106 as an operator steers snow machine 100.

Figure 1:
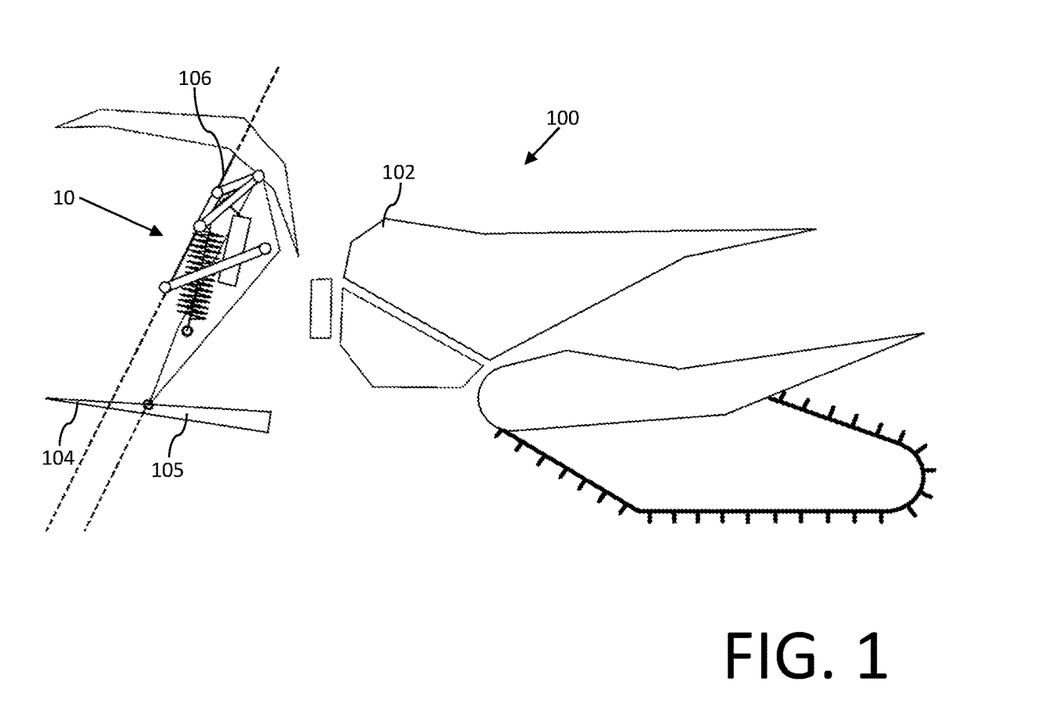
FIG. 1 is a snow machine with a dive-resistant front suspension.
Figure 2:
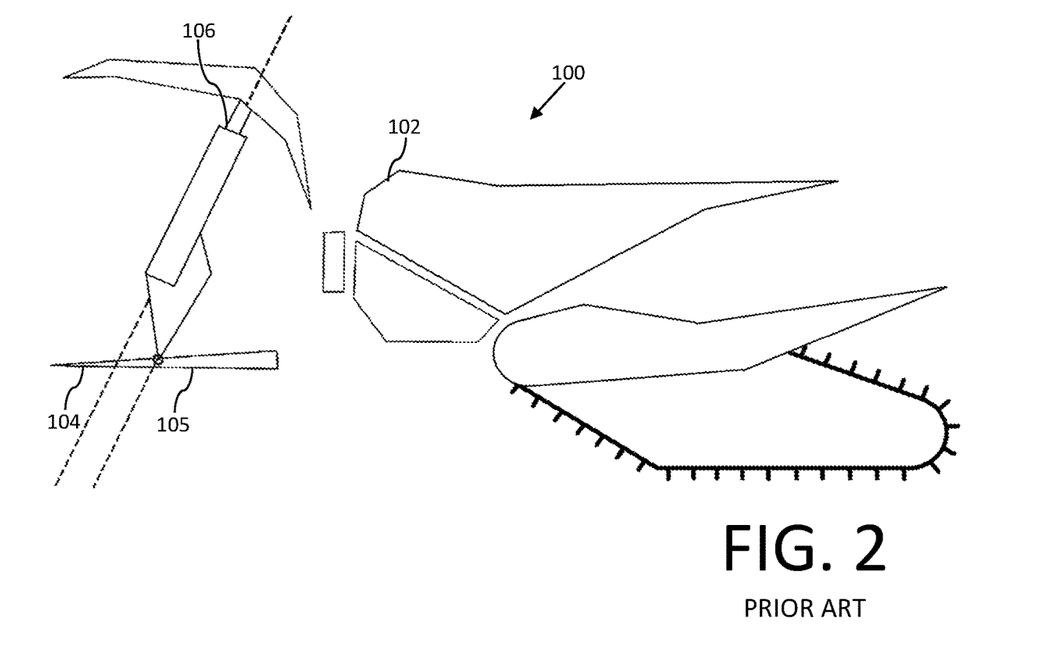
FIG. 2 is a snow machine with a telescoping front suspension known in the prior art.

As with a traditional suspension, such as the suspension depicted in FIG. 2, the purpose of suspension 10 is to provide cushioning when an impact occurs. In addition, the traditional suspension will also experience some compression when friction is applied to snow ski 104 as it passes over a ground surface. For example, the ground surface may be soft snow, hard snow, bare ground, or obstacles such as rocks, logs and the like. In each case, as friction is applied against the motion of the ski, it will cause some compression of the traditional suspension, which may be referred to as "diving". In contrast, suspension 10 as described herein is intended to resist or reduce diving by defining a different compression path.

Figure 3:
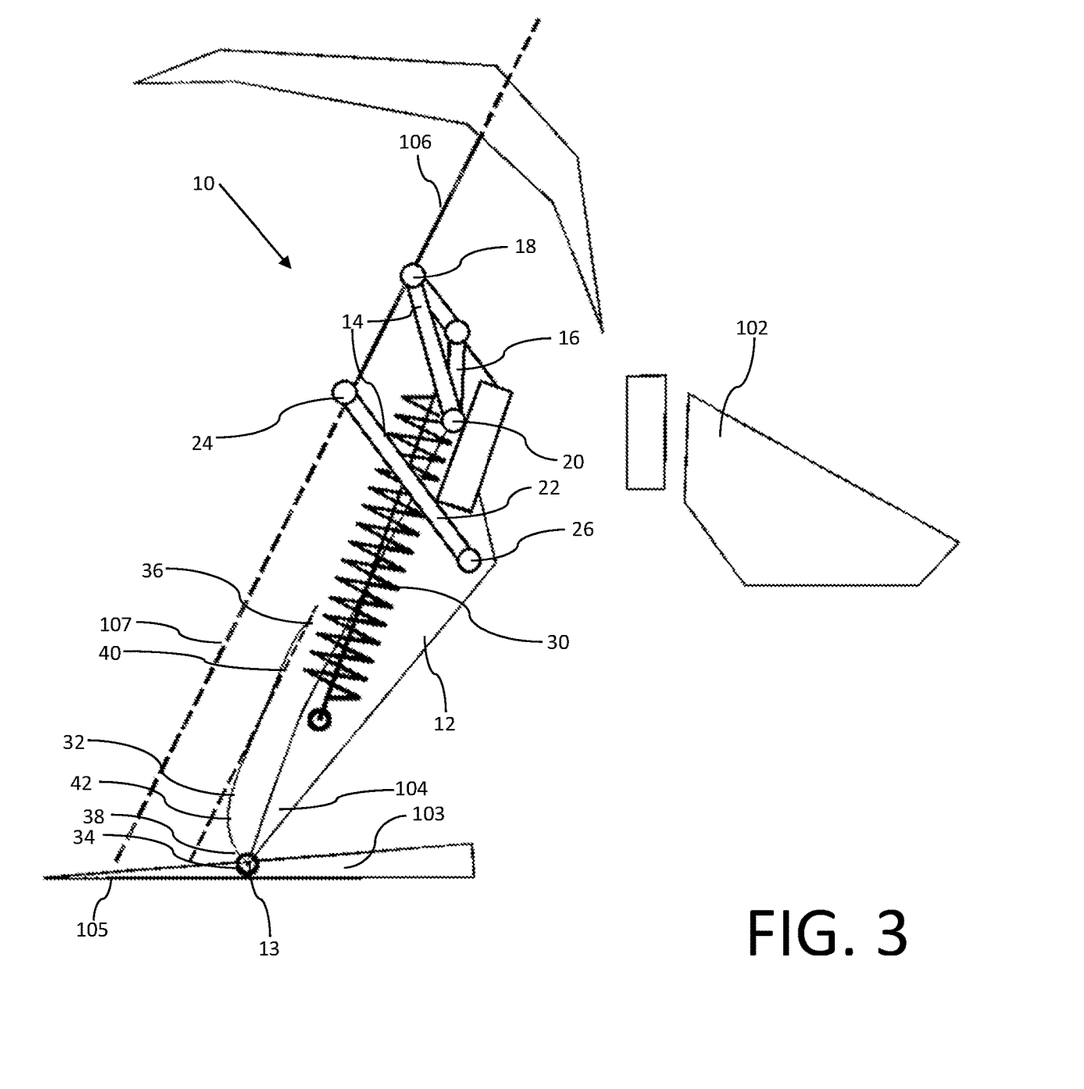
FIG. 3 is a schematic of a first example of a dive-resistant suspension where the snow ski is in the extended position.
Figure 4:
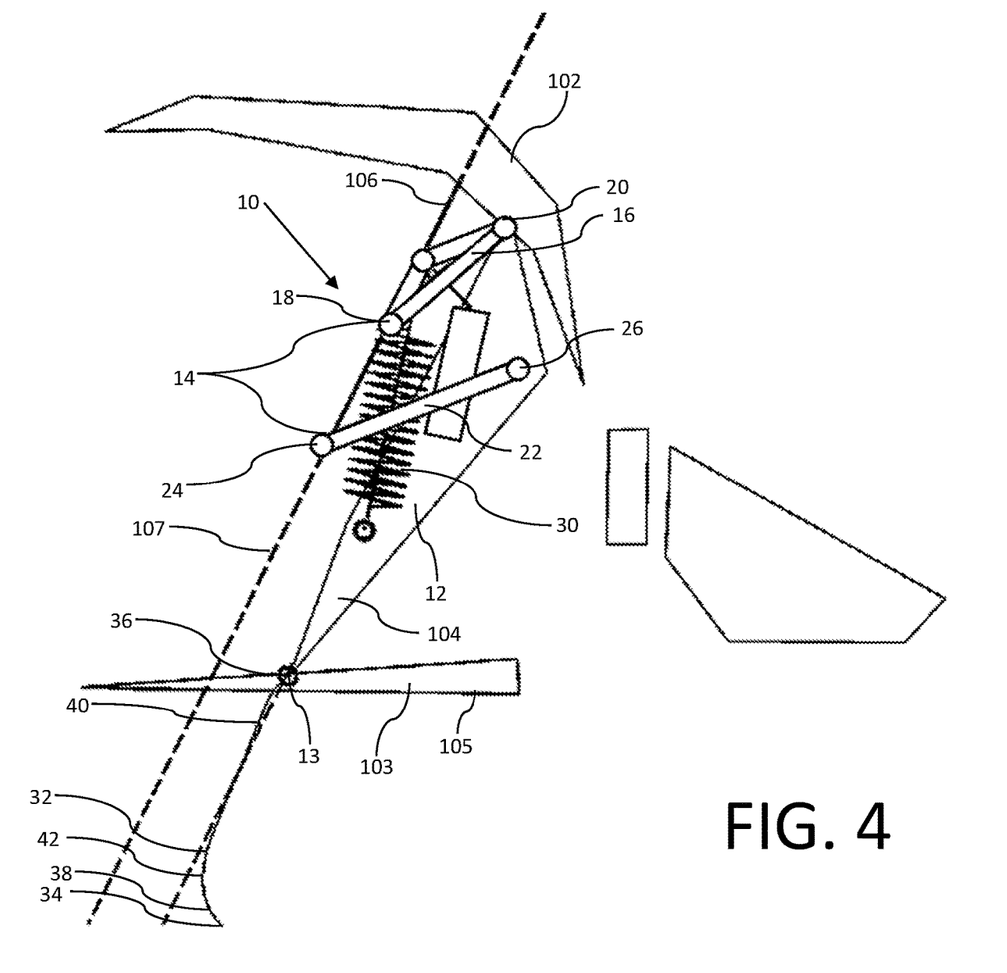
FIG. 4 is a schematic of a dive-resistant suspension where the snow ski is in the retracted position.

Referring to FIG. 3, suspension 10 connects a snow assembly 104 to body 102 via a swing arm 14. Ski assembly 104 may include an extension 12 to which a ski 103 is pivotally attached at the bottom of extension 12. In the depicted example, ski assembly 104 has a single ski 103. While assembly 104 may have more than one ski, they will typically work together as a single unit in this type of snow machine. Swing arm 14 may be attached to extension 12 of ski assembly 104. Ski assembly 104 is able to pivot relative to body 102 as steering column 106 is manipulated to steer snow machine 100. In the embodiment shown in FIG. 3, swing arm 14 has a first rigid linkage 16 and a second rigid linkage 22. First rigid linkage 16 has a first pivot point 18 connected to steering column 106 and a second pivot point 20 connected to extension 12 of ski assembly 104. Second rigid linkage 22 also has a first pivot point 24 connected to steering column 106 and a second pivot point 26 connected to extension 12. First and second rigid linkages 16 and 22 are spaced apart to form swing arm 14. Pivot points 18, 20, 24 and 26 permit movement of ski assembly 104 between an operative position shown in FIG. 3 and a collapsed position shown in FIG. 4. A resilient member 30 provides cushioning to suspension 10 and biases ski assembly 104 toward the operative position.

Resilient member 30 may be a spring, pneumatic cylinder, or a combination thereof. As depicted in FIG. 3 to FIG. 7, resilient member 30 is connected between first rigid linkage 16 and extension 12 of snow assembly 104, however resilient member 30 may be connected between any two positions on any of the ski assembly 104, first rigid linkage 16, second rigid linkage 22, and body 102. In one example, shown in FIG. 11, resilient member 30 is connected between second rigid linkage 22 and steering column 106. In another example, shown in FIG. 11, resilient member 30 is connected between swing arm 14 and body 102. Resilient member 30 generally provides a returning force, typically compressive but may be tensile, to provide cushioning to suspension 10 and bias swing arm 14 downward such that ski assembly 104 is biased toward the operative position. Suspension 10 may have a plurality of resilient members 30 connected in parallel to achieve the desired level of suspension.

Swing arm 14 defines a travel path 32 along which ski assembly 104 can move when traveling between the operative position and the collapsed position. Travel path 32 is the curvilinear path that a point 13 of ski assembly 104 traces out. Preferably, point 13 corresponds to the pivot point between ski 103 and extension 12 of ski assembly 104. Travel path 32 is defined by the relative position of pivot points 18, 20, 24 and 26 and the length of linkages 16 and 22. For the example shown in FIG. 12, travel path 32 is defined by the movement of swing arm 14, where travel path 32 extends between an extended point 34 corresponding to the operative position of ski assembly 104 and a retracted point 36 corresponding to the collapsed position of ski assembly 104. Travel path 32 lies within a plane that is perpendicular to the ground surface and parallel to a forward direction of travel of snow machine 100. During a turn, the plane may remain stationary relative to body 102 or it may rotate with ski assembly 104, depending on whether swing arm 14 is mounted directly to body 102, is attached to the steering column of body 102. Travel path 32 may be movable depending on how suspension 10 is attached to snow machine 100. For example, if suspension 10 is attached to steering column 106, suspension 10 may rotate around a central axis 107 of steering column 106 and travel path 32 may rotate about central axis 107 while maintaining the same curvilinear shape. A vertical force applied to a bottom surface 105 of ski assembly 104, such as impacts from uneven terrain or as snow machine 100 lands from a drop, urges ski assembly 104 toward the retracted position as with a typical suspension.

Figure 5:
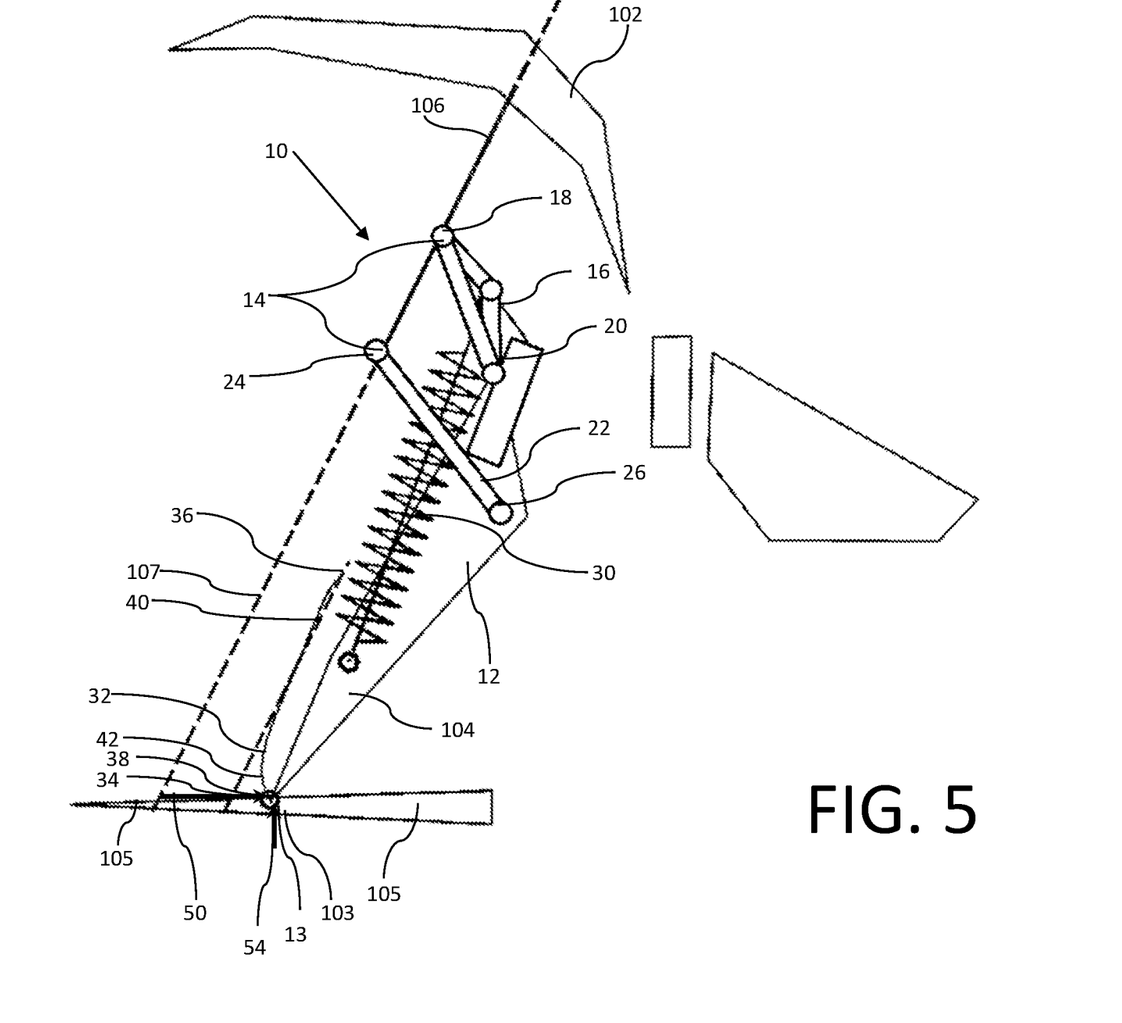
FIG. 5 is a schematic of a dive-resistant suspension where the snow ski is in the first portion of the travel path.
Figure 6:
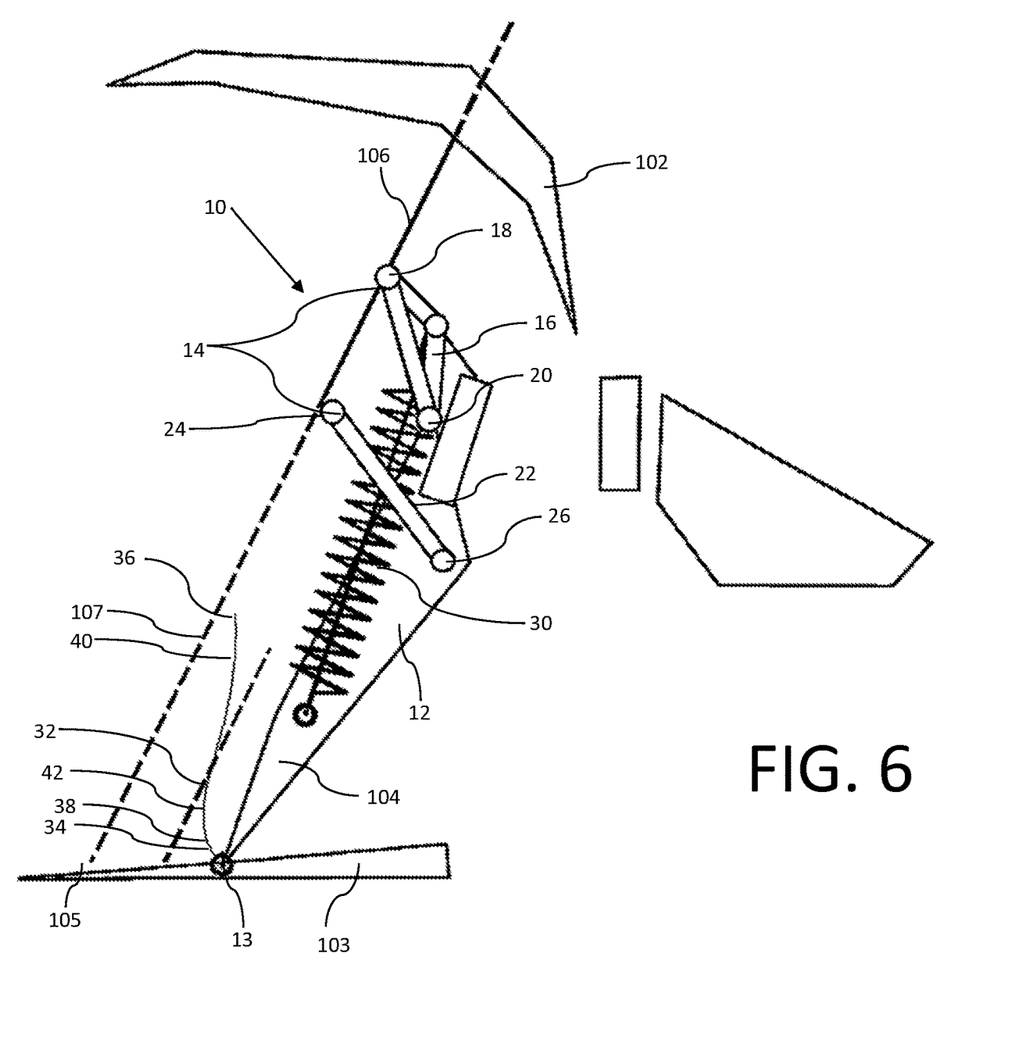
FIG. 6 is a schematic of a first alternative design of a dive-resistant suspension.
Figure 7:
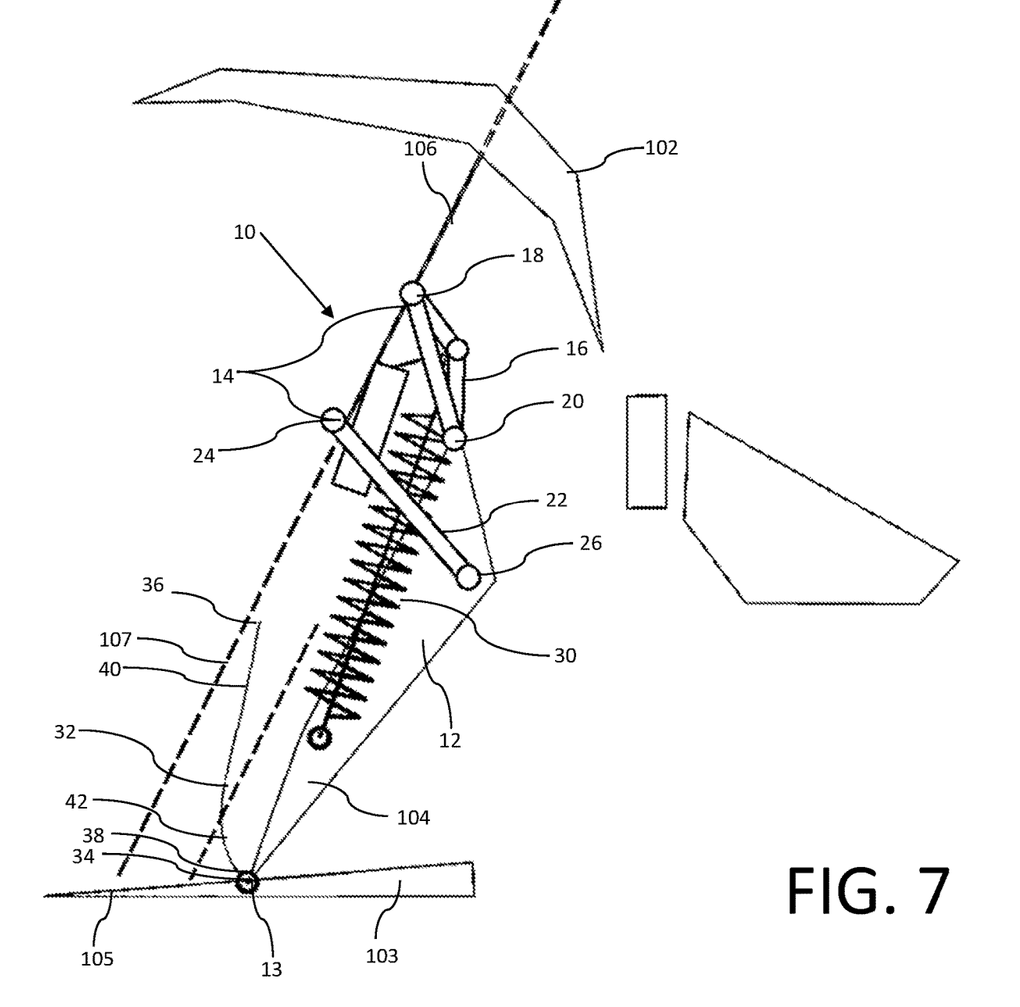
FIG. 7 is a schematic of a second alternative design of a dive-resistant suspension.

Referring to FIG. 5, the operative position of ski assembly 104 corresponds to the position when a neutral weight 54 is applied to swing arm 14 that generally causes a small compression of suspension 10. As such, there may be an extended point 34' spaced from operative point 34 along travel path 32. The biasing force supplied by resilient member 30 is preferably sufficient to ensure suspension 10 is not significantly compressed. The neutral weight may be the weight of snow machine 100, or snow machine 100 and one or more riders (not shown). The neutral weight may be adjusted by adjusting resilient member 30, such as by preloading resilient member 30, or replacing resilient member 30 as required. In terms of travel path 32, neutral weight 54 manifests as a vertical force applied to ski assembly 104 that urges ski assembly 104 toward compression. As will be described below, as snow machine 100 moves forward, an increase in friction force 50 may urge ski assembly 104 toward extended point 34' against the vertical force applied by the neutral weight. In other examples, such as those depicted in FIG. 6, FIG. 7, FIG. 10, and FIG. 11, extended point 34' is not shown.

Travel path 32 has a first portion 38 adjacent to operative point 34. Shown in FIG. 3 to FIG. 7, as ski assembly 104 moves along first portion 38 away from operative point 34, ski assembly 104 moves in a forwards and upwards direction relative to body 102 of snow machine 100 and excludes movement of ski assembly 104 toward a rear end of body 102 as swing arm 14 moves toward the retracted position. In one example, ski assembly 104 may travel in a direction that is angled at 45 degrees relative to a forward direction when moving away from operative point 34 along first portion 38. First portion 38 of travel path 32 causes suspension 10 to resist a diving motion when horizontal friction force 50 is applied to ski assembly 104.

Snow machine 100 has a trail defined as the horizontal distance between bottom point 13 and central axis 107 of steering column 106. When ski assembly 104 is in the first portion of travel path 32 and moves toward operative point 34, the trail of snow machine 100 may increase.

Travel path 32 may have a second portion 40 adjacent to retracted point 36. In one example, shown in FIG. 3 to FIG. 5, second portion 40 may be a substantially straight line in an upward and backward direction relative to body 102 of snow machine 100 and the trail of snow machine 100 remains substantially constant as ski assembly 104 moves along second portion 40 toward retracted point 36. In one example, snow ski may move is a direction that is between 60 and 65 degrees relative to a backward horizontal direction. In another example, shown in FIG. 6, second portion 40 may be a curved line where the trail of snow machine decreases as ski assembly 104 moves along second portion 40 toward retracted point 36. In another example, shown in FIG. 7, second portion 40 may be a substantially straight line where the trail of snow machine decreases as ski assembly 104 moves along second portion 40 toward retracted point 36. Travel path 32 may have a third portion 42 between first portion 38 and second portion 40 that is substantially vertical, or approximately vertical along a certain length.

Figure 8:
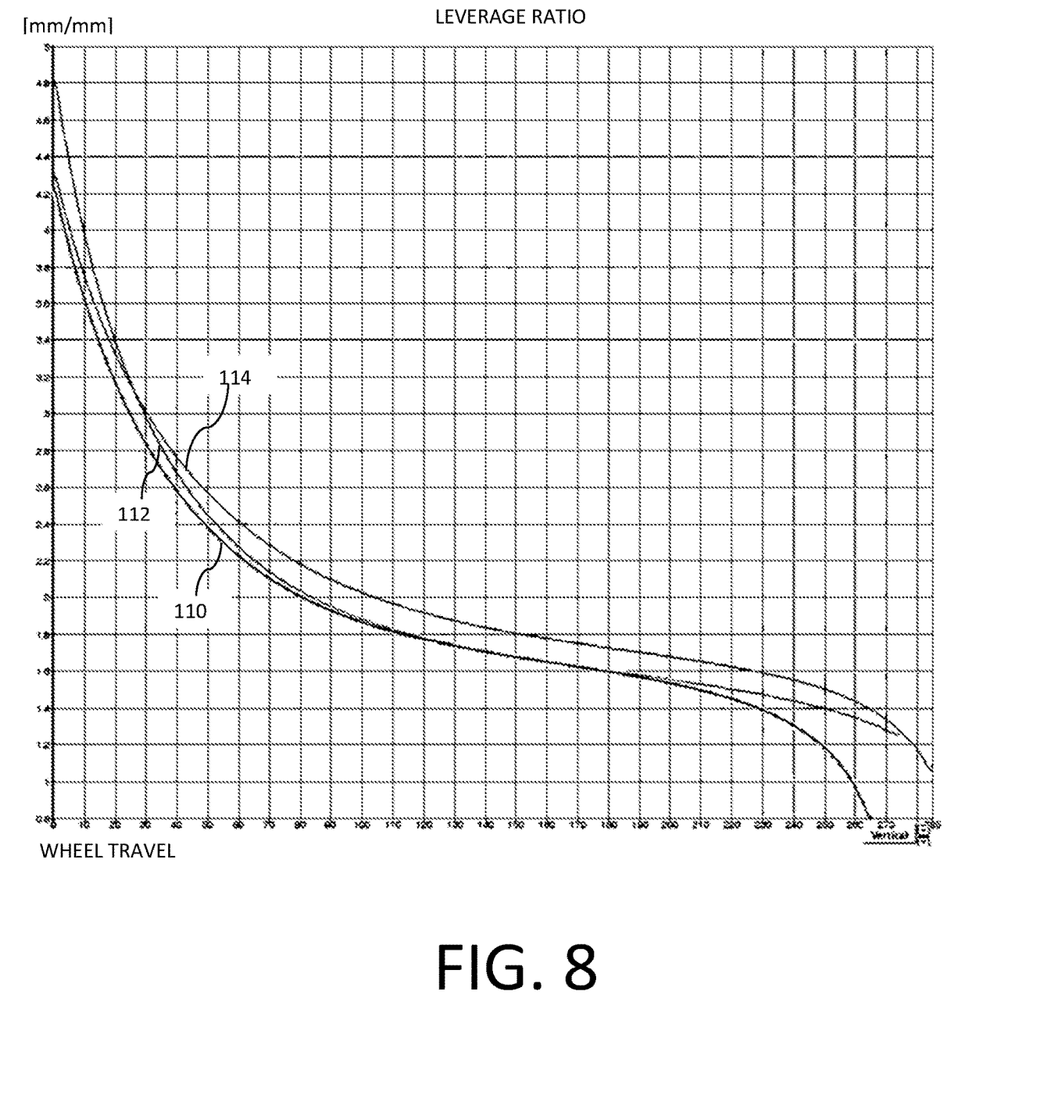
FIG. 8 is a plot of leverage ratios versus snow ski travel of three different examples of a dive-resistant suspension.
Figure 9:
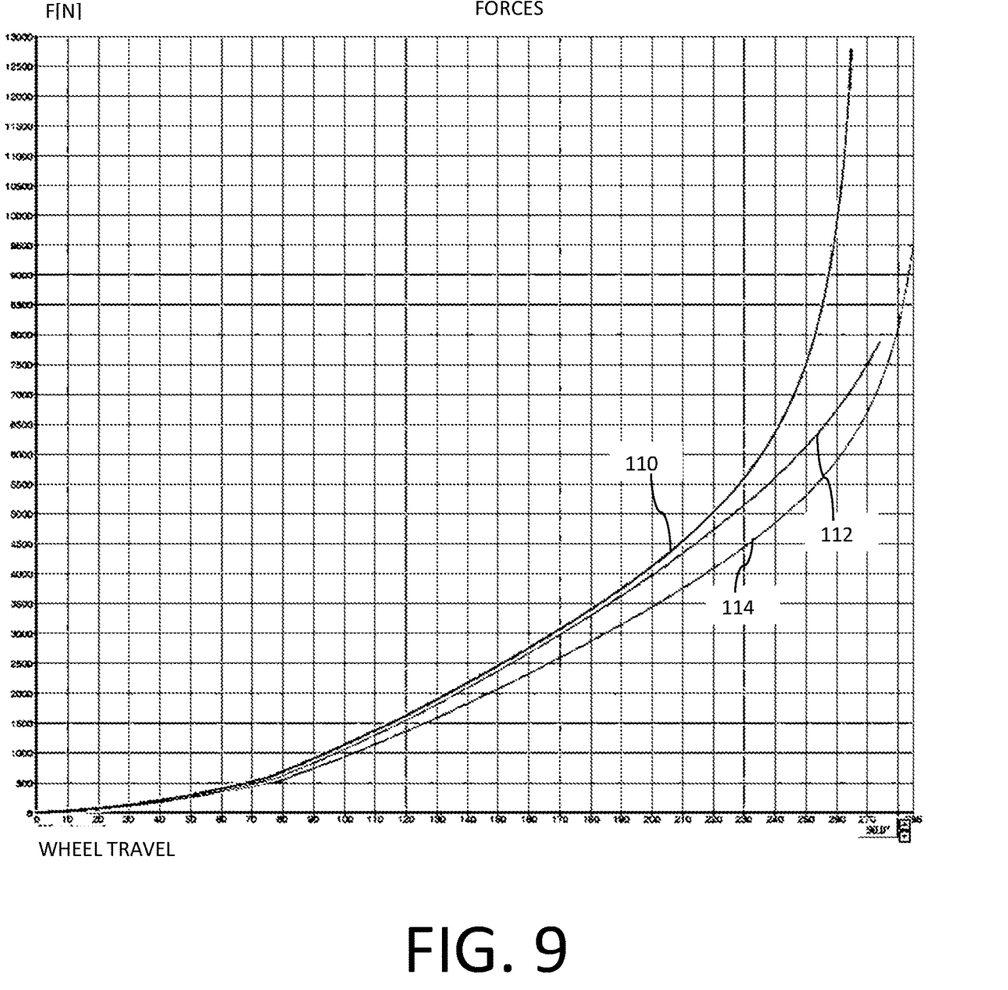
FIG. 9 is a plot of force applied by the resilient member versus snow ski travel of three different examples of a dive-resistant suspension.
Figure 10:
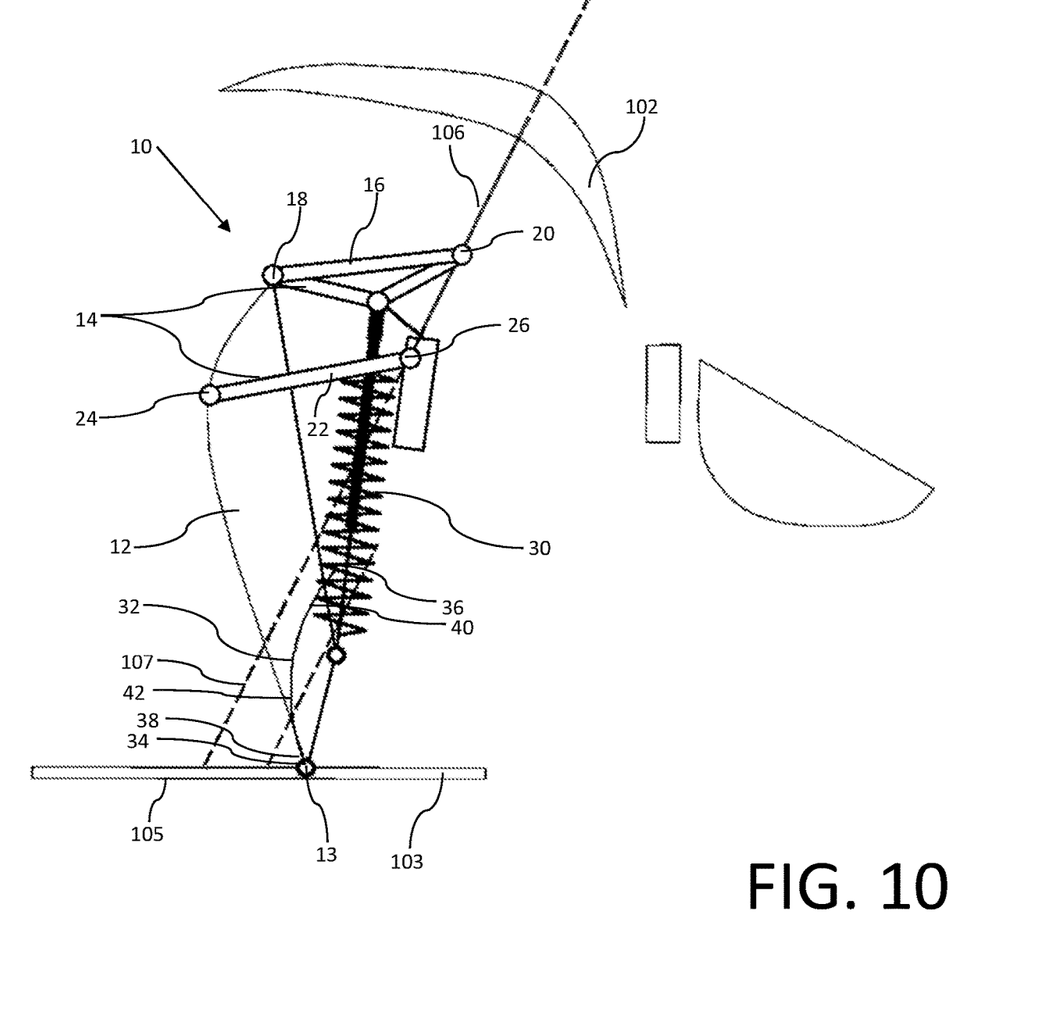
FIG. 10 is a schematic of a dive resistant suspension with a forward configuration.
Figure 11:
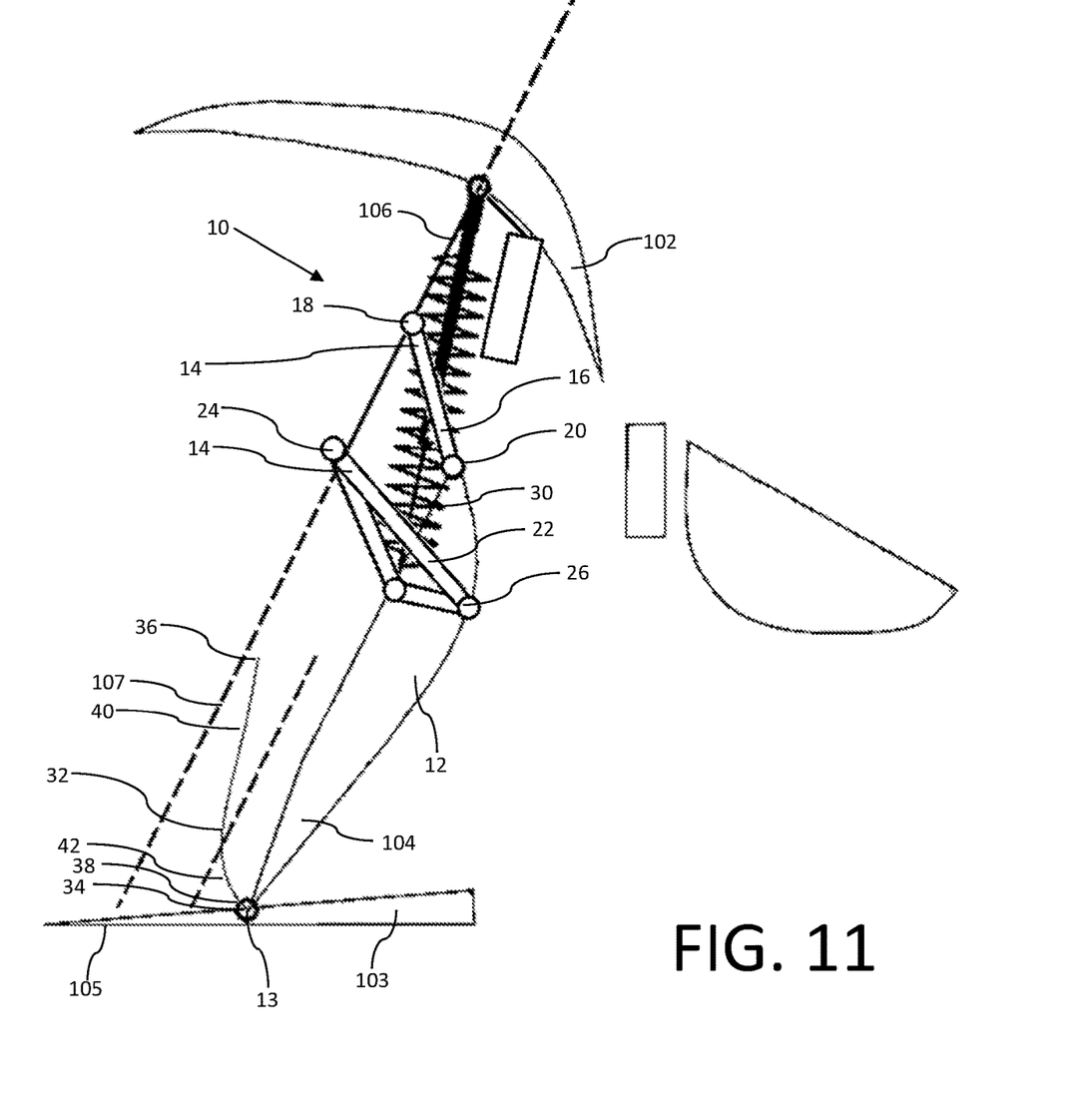
FIG. 11 is a schematic of a dive resistant suspension with an alternative resilient member configuration.
Figure 12:
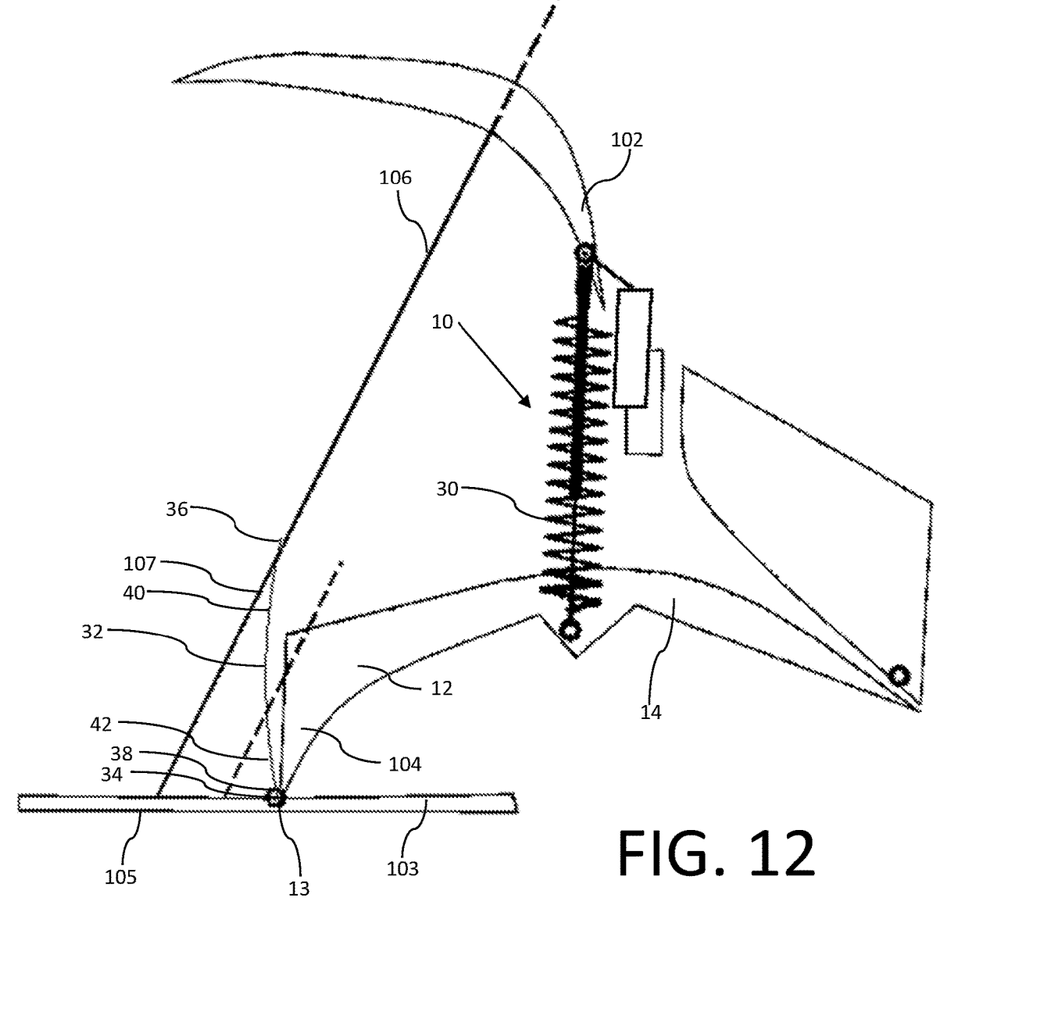
FIG. 12 is a schematic of a dive resistant suspension with a single swing arm connected to the body.

The biasing force supplied by resilient member 30 may be variable and depend on the location of ski assembly 104 along travel path 32. FIG. 8 shows a plot of leverage ratios and FIG. 9 shows the resulting force for suspension 10 in the examples of FIG. 3 to FIG. 7 as ski assembly 104 moves along travel path 32 from the operative point 36 to the retracted point. Lines 110, 112, and 114 correspond to the examples shown in FIG. 3 to FIG. 5, FIG. 6 and FIG. 7 respectively. In the depicted examples, the biasing force of resilient member increases as ski assembly 104 moves toward the retracted position, however it will be understood that other leverage ratio and force curves may be possible.

The behaviour of suspension 10 for the examples depicted in FIG. 3 to FIG. 7 will now be described. It will be understood that different embodiments of suspension 10 may operate in a different manner.

Suspension 10 without any influence from external forces will be biased toward the operative position by resilient member 30 such that ski assembly 104 resides in first portion 38 of travel path 32. Without external influence, resilient member 30 may bias ski assembly 104 to reach extended point 34'. A neutral weight 54, such as the weight of body 102 and one or more riders, may applied to suspension 10, causing suspension 10 to compress to the operative Resilient member 30 preferably provides enough biasing force to keep ski assembly 104 in first portion 38 of travel path 32 when a neutral weight is applied. In some examples, suspension 10 may be tuned to the expected weight or weight range of the riders, such as by applying a preload to resilient member 30.

As an operator drives snow machine 100 forwards, a friction force 50 may be applied to ski assembly 104 in a horizontal direction toward body 102. When ski assembly 104 is in first portion 38 of travel path 32, friction force 50 may urge ski assembly 104 toward operative point 34. If a vertical force is applied to bottom surface 105 of ski assembly 104, such as when snow machine 100 encounters uneven terrain, suspension 10 may be compressed to cushion the impact of the vertical force, and ski assembly 104 may move along travel path 32 into a third portion 42 in which ski assembly 104 moves in a substantially vertical direction relative to body 102 of snow machine 100. Resilient member 30 may provide a larger biasing force toward operative position when ski assembly 104 is in third portion 42 relative to when snow ski is in first portion 38. When ski assembly 104 is in third portion of travel path 32, a horizontal force applied to ski assembly 104 may not cause ski assembly 104 to be urged in either direction along travel path 32.

When a sufficiently large vertical force is applied to ski assembly 104, such as when show machine encounters large bumps in the terrain or lands after a jump, suspension 10 compresses such that ski assembly 104 enters a second portion 40 of travel path 32. Depending on the design of suspension 10, the travel of snow machine 100 may stay the same, increase, decrease, or a combination thereof as ski assembly 104 travels along second portion 40. A biasing force of resilient member 30 may be increase in second portion 40 relative to third portion 42. In one example, such as the one shown in FIG. 9, the biasing force increases greatly as ski assembly 104 approached retracted point 36. Suspension 10 may be designed such that during normal operation it is unlikely that ski assembly 104 will reach retracted point 36 to prevent suspension 10 from bottoming out. In second portion 40 a horizontal force applied in a direction toward body 102, such as friction force 50, may urge ski assembly 104 toward retracted point 36, however the effect of friction force 50 may be small compared to the effect of the vertical force required to enter second portion 40.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A dive-resistant suspension for a snow machine having a ski assembly and a body, the dive-resistant suspension comprising:
   a swing arm connected between the ski assembly and the body, the swing arm comprising:

a first rigid linkage having a first pivot point connected to the body of the snow machine and a second pivot point connected to the ski assembly; and a second rigid linkage having a first pivot point connected to the body of the snow machine at a point spaced from the first pivot point of the first rigid linkage and a second pivot point connected to the ski assembly at a point spaced from the second pivot point of the first rigid linkage; and a resilient member that biases the swing arm downward relative to the body;

wherein the swing arm defines a travel path of the ski assembly as the swing arm moves between an operative position and a retracted position, the travel path lying within a plane that is perpendicular to a ground surface, and parallel to a forward direction of travel of the body, the travel path having a first portion that starts at the operative position, the first portion excluding movement of the ski assembly toward a rear end of the body as the swing arm moves toward the retracted position.

2. The dive-resistant suspension of claim 1, wherein the body of the snow machine comprises a steering column and the first pivot points of the first and second rigid linkages are connected to the steering column.

3. The dive-resistant suspension of claim 1, wherein the operative position is achieved when the snow machine applies a neutral weight to the ski assembly.

4. The dive-resistant suspension of claim 1, wherein a second portion of the travel path follows the first portion, wherein, in the second portion of the travel path, the ski assembly moves up and back relative to the body of the snow machine.

5. The dive-resistant suspension of claim 1, wherein the resilient member comprises a spring or a pneumatic cylinder.

6. The dive-resistant suspension of claim 1, wherein the resilient member is connected between any two elements of a group consisting of the body, the ski assembly, the first rigid linkage, and the second rigid linkage.

7. The dive-resistant suspension of claim 1, wherein an upward force applied to the ski assembly relative to the body urges the ski assembly toward the retracted position.

8. The dive-resistant suspension of claim 1, wherein a trail of the ski assembly increases as the ski assembly moves toward the operative position in the first portion of the travel path.

9. The dive-resistant suspension of claim 1, wherein a second portion of the travel path follows the first portion as the ski assembly moves from the operative position toward the retracted position, wherein a trail of the ski assembly decreases as the ski moves along the second portion of the travel path toward the retracted position.

10. The dive-resistant suspension of claim 1, wherein a biasing force of the resilient member increases as the ski assembly moves toward the retracted position.

11. A dive-resistant suspension for a snow machine that resists compression due to friction while the snow machine is being operated, the snow machine having a body and a ski assembly, the dive-resistant suspension comprising:

a swing arm pivotally connected between the body and the ski assembly, the swing arm being biased downward relative to the body, a pivotal movement of the swing arm defining a travel path of the ski assembly between an operative position and a retracted position;

wherein the travel path comprises a first portion that starts at the operative position and lies within a plane that is perpendicular to a ground surface and parallel to a forward direction of travel of the body, the first portion excluding movement of the ski assembly toward a rear end of the body as the swing arm moves toward the retracted position.

12. The dive-resistant suspension of claim 11, wherein an upward force applied to the ski assembly relative to the body urges the ski assembly toward the retracted position of the travel path.

13. The dive-resistant suspension of claim 11, wherein the operative position is achieved when the snow machine applies a neutral weight to the ski assembly.

14. The dive-resistant suspension of claim 11, wherein a horizontal force applied to the ski assembly toward the body urges the ski assembly toward the operative position of the travel path when the ski assembly is in the first portion of the travel path.

15. The dive-resistant suspension of claim 14, wherein the horizontal force comprises friction from a ground surface.

16. The dive-resistant suspension of claim 11, wherein a trail of the ski assembly increases when the ski assembly moves along the first portion of the travel path toward the operative position.

17. The dive-resistant suspension of claim 11, wherein a trail of the ski assembly decreases when the ski assembly moves along a second portion of the travel path that follows the first portion as the ski assembly moves from the operative position toward the retracted position.

18. The dive-resistant suspension of claim 11, wherein the swing arm is biased by a spring or pneumatic cylinder.

\* \* \* \* \*